Jan. 6, 1931. A. McWILLIAMS 1,787,870

DEVICE USEFUL IN THE SHIPPING AND PACKING OF AUTOMOBILES

Filed July 16, 1928

INVENTOR.
Alexander McWilliams
BY
Underwood and Hardesty
ATTORNEYS

Patented Jan. 6, 1931

1,787,870

UNITED STATES PATENT OFFICE

ALEXANDER McWILLIAMS, OF FORD CITY, ONTARIO, CANADA, ASSIGNOR TO FORD MOTOR COMPANY OF CANADA, LIMITED, OF FORD CITY, ONTARIO, CANADA

DEVICE USEFUL IN THE SHIPPING AND PACKING OF AUTOMOBILES

Application filed July 16, 1928. Serial No. 293,138.

The present invention relates to devices useful in the packing and shipping of automobiles and is especially designed for use with the well known Model T Ford, but is not limited in its use therewith as with minor modifications, it may be adapted to other automobiles.

Heretofore in the packing for shipment of automobiles, in closed freight cars, it has been found that it is necessary or desirable to compress the springs of said vehicles, both for the purpose of decreasing the space occupied by the vehicle and also for the purpose of rendering them more rigid and hence less liable to injury.

Among the objects of the present invention, is means for clamping in compressed condition, the springs of such vehicles so as to enable the easy and quick application of such means and lessen the liability of accidental displacement.

Another object is means for the purpose indicated which shall be simple and cheap in construction and substantially incapable of improper operation.

Still other objects will be readily apparent to those skilled in the art upon reference to the following description and the accompanying drawing in which Figure 1 is a more or less diagrammatic front elevation of the front axle, springs and front frame member of an automobile with the present device in place.

Figure 1:
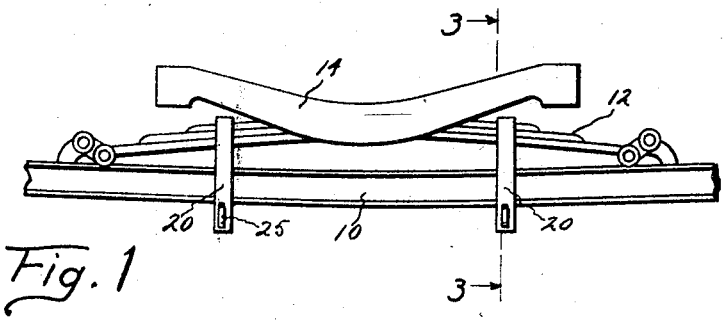
Figure 2:
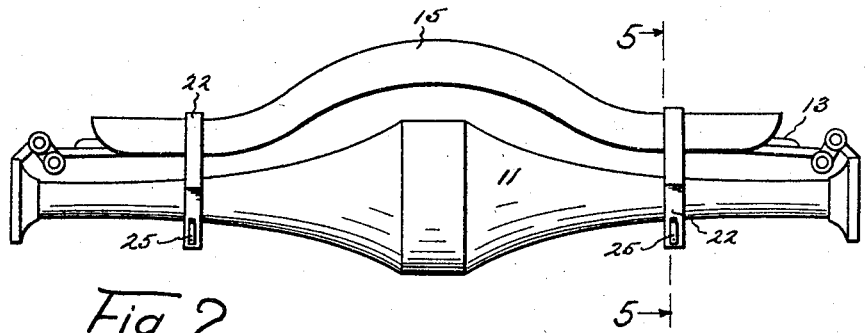
Figure 2 is a similar view of the rear axle of such a vehicle.

In the drawings, a front axle of the vehicle is indicated at 10 and a rear axle at 11. The front spring is indicated at 12 and the rear spring at 13. In the construction shown, the two springs are indicated as being seated in channel members 14 and 15 respectively, and the former of these is shown as bent upwardly, while the other one is bent downwardly and more or less follows the contour of the spring.

The spring compression retaining device of the present invention consists of a U-shaped member 20 having slots 21 near its free ends and preferably formed of flat bar stock. This member 20 should be of sufficient width at its closed end to brace the spring or the spring and channel as the case may be. The member 22 is shown as being somewhat wider than the member 20 and adapted to embrace the channel 15 as well as the spring 13.

Figures 3, 4, 5, 6:
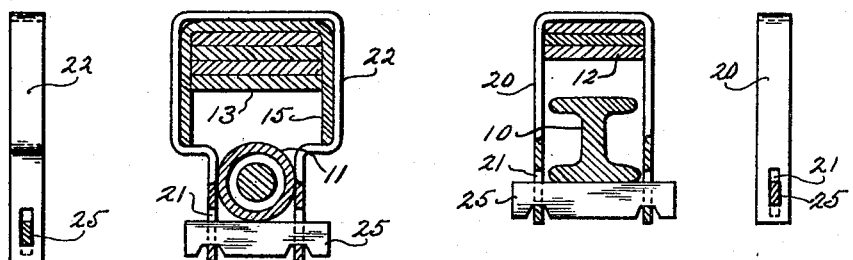
Figure 3 is a section on line 3—3 of Figure 1.
Figure 4 is a side view of the device shown in Figure 3.
Figure 5 is a section on the line 5—5 of Figure 2.
Figure 6 is a side elevation of the device shown in Figure 5.

In the case of the front axle, the channel member 14 does not lie so close to the springs and hence the member 20 need be wide enough to embrace only the spring. The open end of the U-shaped member is adapted to span the respective axles 10 and 11 and when the springs are compressed, the member 20 or the member 22 extends sufficiently far below the axle to enable the passage through slots 21 of a notched bar 25 of which the notches open downwardly and are spaced to receive the ends of the U-shaped member, as shown clearly in Figures 3 and 5. It is preferred to make this bar 25 of stock similar to that of the U-shaped member for economy. Release of the springs will then cause the bar 25 to bear against the lower sides of the axle and maintain the springs in their compressed condition with no possibility of the bar 25 being displaced by accident.

Now having described the invention and the preferred forms of embodiment thereof, it is to be understood that the said invention is to be limited not to the specific details herein described and set forth but only by the scope of the claim which follows.

What I claim is:—

Means for holding compressed springs of vehicles for shipment, comprising a one piece U-shaped member of flat bar stock having aligned slots in its free ends and adapted to embrace a spring and an axle, and a bar of similar stock having downwardly opening notches in its lower edge adapted to pass thru said slots and to receive and lock the ends of said U-shaped member in its notches.

ALEXANDER McWILLIAMS.